US010399907B2

(12) United States Patent
Easter et al.

(10) Patent No.: US 10,399,907 B2
(45) Date of Patent: Sep. 3, 2019

(54) CERAMIC COMPOSITE STRUCTURES AND PROCESSING TECHNOLOGIES

(71) Applicant: Dynamic Material Systems, LLC, Oviedo, FL (US)

(72) Inventors: William Easter, Chuluota, FL (US); Arnold Hill, Orlando, FL (US)

(73) Assignee: Dynamic Material Systems, LLC, Oviedo, FL (US)

( * ) Notice: Subject to any disclaimer, the term of this patent is extended or adjusted under 35 U.S.C. 154(b) by 114 days.

(21) Appl. No.: 15/467,521

(22) Filed: Mar. 23, 2017

(65) Prior Publication Data

US 2017/0190628 A1 Jul. 6, 2017

Related U.S. Application Data

(60) Continuation-in-part of application No. 14/858,096, filed on Sep. 18, 2015, now Pat. No. 9,764,987, and
(Continued)

(51) Int. Cl.
*C04B 35/71* (2006.01)
*C04B 35/571* (2006.01)
(Continued)

(52) U.S. Cl.
CPC ........ *C04B 35/806* (2013.01); *C04B 35/5603* (2013.01); *C04B 35/571* (2013.01);
(Continued)

(58) Field of Classification Search
CPC ................ C04B 35/571; C04B 35/589; C04B 2235/616
See application file for complete search history.

(56) References Cited

U.S. PATENT DOCUMENTS 3,503,060 A 3/1970 Goddard et al.
3,682,083 A 8/1972 Puente
(Continued)

FOREIGN PATENT DOCUMENTS

JP 2006076822 3/2006
WO 2015023612 2/2015
WO WO 2015023612 A2 * 2/2015 ............... C09K 8/80

OTHER PUBLICATIONS

Colombo, Paolo, Polymer-Derived Ceramics: 40 Years of Research and Innovation in Advanced Ceramics, J. Am. Ceram. Soc., 2010, vol. 93, No. 7, 33 pages.
(Continued)

*Primary Examiner* — Erin Snelting
(74) *Attorney, Agent, or Firm* — Brian S. Steinberger; Law Offices of Brian S. Steinberger, P.A.

(57) ABSTRACT

Methods, systems, and processes are used to prepare novel ceramic composite structures that are strong, durable, lightweight, high performance and suitable for a myriad of industrial applications, including, but not limited to, ceramic plates of material suitable for use as ballistic armor. The low manufacturing costs of the processes disclosed provide cheaper, faster ways of producing ceramic matrix composites at lower temperatures and allow for the existence of composite materials and structures which currently are not available.

7 Claims, 7 Drawing Sheets

Produce a green body structure from various PDC precursor resins — 300

Place finished green body component into furnace and fire to a final temperature less than 400°C to convert to plastic/ceramic — 310

Infiltrate various filler materials into the pore structure of the plastic/ceramic — 320

Process as necessary depending on the type of filler which was infiltrated — 330

Related U.S. Application Data a continuation-in-part of application No. 14/598,658, filed on Jan. 16, 2015, now Pat. No. 9,434,653, which is a division of application No. 13/775,594, filed on Feb. 25, 2013, now Pat. No. 8,961,840.

(60) Provisional application No. 62/313,422, filed on Mar. 25, 2016, provisional application No. 62/053,479, filed on Sep. 22, 2014, provisional application No. 61/606,007, filed on Mar. 2, 2012.

(51) Int. Cl.

| | |
|---|---|
| ***C04B 35/589*** | (2006.01) |
| ***C04B 35/597*** | (2006.01) |
| ***C04B 35/80*** | (2006.01) |
| ***C04B 38/06*** | (2006.01) |
| ***C04B 35/56*** | (2006.01) |
| ***C04B 35/58*** | (2006.01) |
| ***C04B 35/626*** | (2006.01) |
| ***C04B 35/628*** | (2006.01) |
| ***C04B 35/76*** | (2006.01) |
| ***C04B 38/00*** | (2006.01) |
| ***C09K 8/80*** | (2006.01) |
| ***C10M 159/00*** | (2006.01) |

(52) U.S. Cl.

CPC ............ *C04B 35/58* (2013.01); *C04B 35/589* (2013.01); *C04B 35/597* (2013.01); *C04B 35/62675* (2013.01); *C04B 35/62873* (2013.01); *C04B 35/76* (2013.01); *C04B 38/008* (2013.01); *C04B 38/067* (2013.01); *C09K 8/805* (2013.01); *C10M 159/00* (2013.01); *C04B 2235/48* (2013.01); *C04B 2235/483* (2013.01); *C04B 2235/526* (2013.01); *C04B 2235/5224* (2013.01); *C04B 2235/5244* (2013.01); *C04B 2235/5248* (2013.01); *C04B 2235/5288* (2013.01); *C04B 2235/602* (2013.01); *C04B 2235/608* (2013.01); *C04B 2235/656* (2013.01)

(56) References Cited

U.S. PATENT DOCUMENTS

| | | | | |
|---|---|---|---|---|
| 4,571,331 | A | 2/1986 | Endou et al. | |
| 4,856,887 | A | 8/1989 | Wakugawa et al. | |
| 5,002,378 | A | 3/1991 | Colarusso et al. | |
| 5,204,124 | A | 4/1993 | Secretan et al. | |
| 5,221,294 | A | 6/1993 | Carman et al. | |
| 5,431,967 | A | 7/1995 | Manthiram et al. | |
| 5,565,052 | A | 10/1996 | Papenburg et al. | |
| 5,632,834 | A | 5/1997 | Ostertag et al. | |
| 5,665,848 | A * | 9/1997 | Barnard | C04B 35/571 427/387 |
| 5,853,214 | A | 12/1998 | Babbs et al. | |
| 5,853,653 | A * | 12/1998 | Donato | C04B 35/571 264/625 |
| 5,948,495 | A | 9/1999 | Stanish et al. | |
| 5,976,454 | A | 11/1999 | Sterzel et al. | |
| 6,036,031 | A | 3/2000 | Ishikawa | |
| 6,092,981 | A | 7/2000 | Pfeiffer et al. | |
| 6,153,547 | A | 11/2000 | Sterzel | |
| 6,206,531 | B1 | 3/2001 | Williams et al. | |
| 6,455,395 | B1 | 9/2002 | Boyle et al. | |
| 6,521,246 | B2 | 2/2003 | Sapieszko et al. | |
| 6,617,540 | B2 | 9/2003 | Zehavi | |
| 6,680,013 | B1 | 1/2004 | Stein et al. | |
| 6,926,925 | B2 | 8/2005 | Thebault et al. | |
| 7,168,564 | B2 | 1/2007 | Bhatt et al. | |
| 7,334,690 | B2 | 2/2008 | Huang et al. | |
| 7,694,690 | B2 | 4/2010 | Yen | |
| 8,119,057 | B2 | 2/2012 | Fei et al. | |
| 8,192,032 | B2 | 6/2012 | Takahashi et al. | |
| 8,293,048 | B2 | 10/2012 | Fei et al. | |
| 8,378,877 | B2 | 2/2013 | Tishin et al. | |
| 8,961,840 | B1 | 2/2015 | Hill et al. | |
| 9,348,126 | B2 | 5/2016 | Cook | |
| 9,434,653 | B1 | 9/2016 | Hill et al. | |
| 9,764,987 | B2 | 9/2017 | Hill et al. | |
| 9,944,021 | B2 | 4/2018 | Easter et al. | |
| 2002/0140137 | A1 | 10/2002 | Sapieszko et al. | |
| 2003/0008067 | A1 | 1/2003 | Yamaguchi et al. | |
| 2003/0117730 | A1 | 6/2003 | Krodel et al. | |
| 2004/0048731 | A1 | 3/2004 | Kim et al. | |
| 2004/0138046 | A1 | 7/2004 | Sherwood, Jr. et al. | |
| 2005/0036931 | A1 | 2/2005 | Garcia et al. | |
| 2005/0079086 | A1 | 4/2005 | Farr et al. | |
| 2005/0087903 | A1 | 4/2005 | Farr et al. | |
| 2006/0069176 | A1 | 3/2006 | Bowman et al. | |
| 2006/0141154 | A1 | 6/2006 | Thebault | |
| 2006/0225834 | A1 | 10/2006 | Medina et al. | |
| 2009/0238988 | A1 | 9/2009 | McDaniel et al. | |
| 2010/0038807 | A1 | 2/2010 | Brodkin et al. | |
| 2011/0319252 | A1 | 12/2011 | Schmidt et al. | |
| 2012/0178618 | A1 | 7/2012 | Vinu et al. | |
| 2012/0234681 | A1 | 9/2012 | Lomasney et al. | |
| 2013/0216420 | A1 | 8/2013 | Li et al. | |
| 2013/0243604 | A1 * | 9/2013 | Roussille | B29C 70/24 416/241 A |
| 2014/0202125 | A1 | 7/2014 | Kobashi et al. | |
| 2014/0274658 | A1 | 9/2014 | Sherwood et al. | |
| 2014/0323364 | A1 | 10/2014 | Sherwood et al. | |
| 2015/0252171 | A1 | 9/2015 | Molnar et al. | |
| 2016/0208412 | A1 | 7/2016 | Sandgren et al. | |
| 2017/0001915 | A1 | 1/2017 | Hill | |
| 2017/0008236 | A1 | 1/2017 | Easter | |
| 2017/0050890 | A1 | 2/2017 | Hill | |

OTHER PUBLICATIONS

Ye, et al., Ceramic Microparticles and Capsules via Microfluidic Processing of a Preceramic Polymer, J.R. Soc. Interface, 2010, 13 pages.

Kleebe, et al., Decomposition-Crystallization of Polymer-Derived Si—C—N Ceramics, J. Am. Ceram. 1998, vol. 81, No. 11, 7 pages.

Kroke, et al., Silazane Derived Ceramics and Related Materials, Reports: A Review Journal, 2000, vol. 26, 103 pages.

Riedel, et al., Synthesis of Dense Silicon-Based Ceramics at Low Temperatures, Nature, 1992, vol. 355, 3 pages.

Riedel, et al., Polymer-Derived Si-Based Bulk Ceramics, Part I: Preparation, Processing and Properties, Journal of European Ceramic Society, 1995, vol. 15, 13 pages.

Konetschny, et al., Dense Silicon Carbonitride Ceramics by Pyrolysis of Cross-linked and Warm Pressed Polysilazane Powders, Journal of European Ceramic Society, 1999, vol. 19, 8 pages.

Greil, Peter, Polymer Derived Engineering Ceramics, Advanced Engineering Materials, 2000, vol. 2 No. 6, 10 pages.

Liew, et al., Fabrication of SiCN Ceramic MEMS Using Injectable Polymer-Precursor Technique, Elsevier Science, 2001, vol. 89, 7 pages.

Shah, et al., Mechanical Properties of a Fully Dense Polymer Derived Ceramic Made by a Novel Pressure Casting Process, Acta Materialia, 2002, vol. 50 , 11 pages.

Harshe, et al., Amorphous Si(Al)OC Ceramic from Polysiloxanes: Bulk Ceramic Processing, Crystallization Behavior and Applications, Institute of Materials Science, 2004, vol. 24, 12 pages.

Dynamic Material Systems, LLC et al., PCT/US2016/053518, Notification of Transmittal of the International Search Report and the Written Opinion of the International Searching Authority, or the Declaration, filed Sep. 23, 2016, 15 pages.

Dynamic Material Systems, LLC et al., PCT/US2016/061613, Notification of Transmittal of the International Search Report and the Written Opinion of the International Searching Authority, or the Declaration, filed Nov. 11, 2016, 11 pages.

Wolf, S. and Tauber, R.N., Silicon Processing for the VLSI Era, Process Technology, 2000, vol. 1 (2nd edition), Lattice Press, Sunset Beach, CA., 7 pages.

(56) References Cited

OTHER PUBLICATIONS

Dymanic Material Systems, LLC, PCT Patent Application No. PCT/US16/53518 filed Sep. 23, 2016, Notification of Transmittal of the International Search Report and Written Opinion of the International Searching Authority or the Declaration, dated May 18, 2017, 11 pages.

Dymanic Material Systems, LLC et al., PCT Patent Application No. PCT/US015414 filed Jan. 26, 2018, Notification of Transmittal of the International Search Report and Written Opinion of the International Searching Authority or the Declaration, dated May 15, 2018, 4 pages.

* cited by examiner

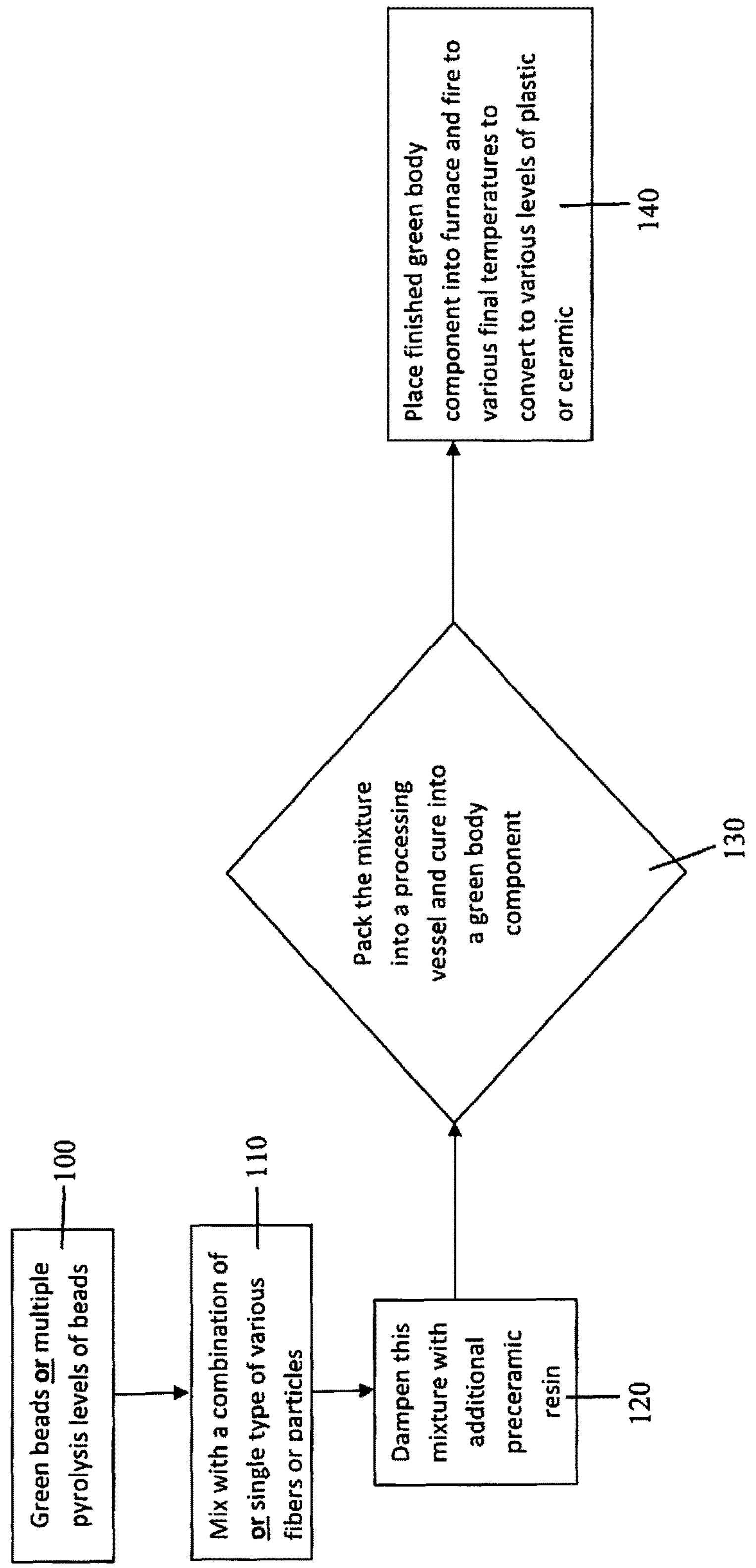
Figure 1
Green beads or multiple pyrolysis levels of beads
100
Mix with a combination of or single type of various fibers or particles
110
Dampen this mixture with additional preceramic resin
120
Pack the mixture into a processing vessel and cure into a green body component
130
Place finished green body component into furnace and fire to various final temperatures to convert to various levels of plastic or ceramic
140

Produce a green body structure from various PDC precursor resins
300
Place finished green body component into furnace and fire to a final temperature less than 400°C to convert to plastic/ceramic
310
Infiltrate various filler materials into the pore structure of the plastic/ceramic
320
Process as necessary depending on the type of filler which was infiltrated
330

CERAMIC COMPOSITE STRUCTURES AND PROCESSING TECHNOLOGIES

CROSS REFERENCE TO RELATED APPLICATIONS

This application claims the benefit of priority to U.S. Provisional Patent Application Ser. No. 62/313,422 filed Mar. 25, 2016, and this application is a Continuation In Part of U.S. patent application Ser. No. 14/858,096 filed Sep. 18, 2015 now U.S. Pat. No. 9,764.987, which claims the benefit of priority to U.S. Provisional Application Ser. No. 62/053,479 filed Sep. 22, 2014. This application is also a Continuation In Part of U.S. patent application Ser. No. 14/598,658 filed Jan. 16, 2014, now U.S. Pat. No. 9,434,653, which is a Divisional of U.S. patent application Ser. No. 13/775,594 filed Feb. 25, 2013, now U.S. Pat. No. 8,961,840, which claims the benefit of priority to U.S. Provisional Application Ser. No. 61/606,007 filed Mar. 2, 2012. The entire disclosure of each application listed in this paragraph is incorporated herein by specific reference thereto.

FIELD OF THE INVENTION

This invention relates to methods, processes and systems for producing ceramic composite structures with tailored performance characteristics using engineering composites, including, but not limited to, polymer-matrix composites, ceramic matrix composites and metal matrix composites.

BACKGROUND AND PRIOR ART

Composite technology provides the means for combining different materials together such as metals, plastics, ceramics, and the like to form multi-layered structures that provide different properties than a unitary material. Typically, these improved properties of composites concern mass, strength, wear resistance, heat resistance, electrical properties, magnetic properties, optical properties, and/or power densities along with many other properties. Humans have been using composites for many millennia including the formulations for brick using straw and mud and formulations for concrete using stones and cement. A current popular composite is fiberglass comprising glass fiber and polymer.

High end engineering composites include MMC (Metal Matrix Composites), PMC (Polymer Matrix Composites) and CMC (Ceramic Matrix Composites). Each of these composite systems are used for specific applications where unitary materials typically do not provide adequate material performance for the usage application. In many cases, fibers are used as reinforcement structures to help with the fracture toughness of the composite. These fibers could be polymer fibers, carbon fibers, ceramic fibers or glass fibers. In the case of CMC (Ceramic Matrix Composites), typically the key performance required is heat resistance. Most CMC are used at temperatures above 1000° C. while PMC (Polymer Matrix Composites) are typically limited to applications below 300° C. MMC (Metal Matrix Composites) are typically used for wear resistance and applications requiring stringent fracture toughness requirements.

CMC (Ceramic Matrix Composites) require very expensive/high energy usage processes. Also, CMCs can have manufacturing intervals lasting months. Typically, CMCs are made using carbon fibers or other high performance fibers as the reinforcement structure. Then, the pores or matrix is infiltrated with a ceramic. Techniques for infiltration include chemical vapor deposition, melt infiltration, polymer injection and pyrolysis using polymer derived ceramics.

The ceramic used in these processes includes silicon carbide (SiC) as well as all the possible polymers with silicon and carbon or aluminum in the backbone of a polymer-derived-ceramics. Specific property advantages of CMCs include high temperature operation, lighter weight structures, and better fracture toughness. Applications for CMCs include high end transportation applications in the automotive, airline, and aerospace industries.

The processes that make CMCs are time consuming, expensive, and energy inefficient. Other disadvantages of CMCs are the inability to use low-melting point materials with the ceramic matrix due to the high temperature processes associated with melt infiltration, chemical vapor deposition, and polymer injection pyrolysis (PIP). Usually infiltration materials had to be stable at temperatures above 1000° C. which would preclude the use of many organic, glass and low-melting point materials. The PIP process uses several cycles of the polymer-injection-pyrolysis to fill in the matrix due to the PDC shrinkage and the need to fill in void spaces. These temperatures typically exceed 1000° C. and can approach 1600° C. in certain cases. These temperatures will melt plastics and other low melting point metals such as aluminum and rule them out as being a material in the composite. What is clearly needed is cheaper and faster ways of making CMCs at lower temperatures. The lower temperature regime will allow for the existence of novel composite materials and structures which currently are not available.

Therefore, there is a need for ceramic composite structures using hundreds of conceivable compositions and combinations of materials to meet the industrial demand for materials that are light-weight, have low manufacturing costs, that can be tailored to perform in a myriad of applications, including, but not limited to, automotive, airline, aerospace, pharmaceutical, biotechnology, electronics, consumer packaged goods, oil, gas and geosciences.

SUMMARY OF THE INVENTION

A primary objective of this invention is to provide methods, systems, and processes to produce ceramic composite structures at a lower manufacturing cost than the current state of the art.

A secondary objective of this invention is to provide methods, systems, and processes to prepare a ceramic composite structure at lower temperature processing and reduced manufacturing intervals than the current state of the art.

A third objective of this invention is to provide methods, systems, and processes to provide a light-weighted ceramic composite that is a significant advantage over glass and existing ceramic technologies.

A fourth objective of this invention is to provide methods, systems, and processes to prepare a ceramic composite of sufficient density wherein a ceramic matrix is filled with metal, plastic, ceramic, resin, or other suitable material using the continuous available pore network.

A fifth objective of this invention is to provide methods, systems, and processes to prepare a ceramic composite that provides an interpenetrating network of both pores and ceramic.

A sixth objective of this invention is to provide methods, systems, and processes to prepare a ceramic composite with a ceramic matrix than is filled with long length fibers wherein the fibers are selected from metallic fibers, glass fibers, carbon fibers, ceramic fibers, graphite fibers, polymeric fibers and mixtures thereof.

A seventh objective of this invention is to provide methods, systems, and processes to prepare a ceramic composite with a ceramic matrix than is filled with non-fibrous substances.

An eighth objective of this invention is to provide methods, systems, and processes to prepare a ceramic composite having a novel composition and structure that has not previously been made due to cost or temperature concerns.

A ninth objective of this invention is to provide methods, systems, and processes to prepare a ceramic composite wherein the ceramic network is made first at temperatures in excess of approximately 1000° C., then infiltrating fillers that would be destroyed at the sintering or curing temperature required to form the ceramic; thus allowing the ability of plastics and low melting temperature metals to be part of a finished ceramic composite.

A tenth objective of this invention is to provide a ceramic composite consisting of ceramic plates or platelets, flakes or chips coated with ballistic polymers or metal and compressed for use in industrial applications, such as ballistic armor, construction, aerospace.

An eleventh objective of this invention is to provide a silicon carbide based microlaminate armor for personnel and vehicle applications.

Polymer Derived Ceramics (PDCs) provide a way to make bulk ceramic and ceramic composites in much lower temperature ranges without the need for sintering of previously made ceramic particles. In all embodiments of this invention, PDCs will provide a way for using a lower energy signature than the energy signature currently used to produce Ceramic Matrix Composites (CMCs).

The issues with Polymer-Derived Ceramics have historically been that "the polymer to ceramic conversion occurs with gas release which typically leads to cracks or pores which make the direct conversion of a preceramic part to dense ceramic virtually unachievable unless its dimension is typically below a few hundred micrometers (as in the case of fibers, coatings, or foams.)" *J. Am. Ceram. Soc.* 93 [7] p. 1811 (2010). The cracks and pores associated with PDC pyrolysis are the reason that Polymer Injection Pyrolysis (PIP) uses so many cycles-taking weeks of time using tremendous amounts of energy.

The inventors on the present patent application have solved this problem with the previously issued U.S. Pat. No. 8,961,840 which is incorporated herein by reference. U.S. Pat. No. 8,961,840 is related to the present invention and solves the problem of making a direct conversion of a preceramic part (green body) to a dense ceramic without gas release that typically leads to cracks or pores.

In the current patent application, some of the same principles of U.S. Pat. No. 8,961,840 will be used to produce Ceramic Matrix Composites (CMCs). Other principles used in previous inventions including 3D printing, mirror parts, and improved chemistries/particles/fillers are applicable here. Several processes of Additive Manufacturing/3D Printing of PDCs are covered by the present inventors in U.S. Provisional Patent Application Ser. No. 62/232,033 which is also incorporated herein by reference.

As stated previously, the ease of providing a light-weighted component is a significant advantage over other glass and ceramic technologies. The same chemistries that are available with U.S. Pat. No. 8,961,840 for producing bulk ceramics as well as the chemistries associated with U.S. patent application Ser. No. 14/858,096, now U.S. Pat. No. 9,434,653 for ceramic particles are applicable here and are incorporated herein by reference.

The basic invention is to make a thick bulk ceramic structure of sufficient density to be the ceramic matrix; prior to the invention in U.S. Pat. No. 8,961,840, only low density foams were available. This structural element will then be filled with metal, plastic, ceramic, resin, or other material using the continuous available pore network. One of the unique features of the invention in U.S. Pat. No. 8,961,840 is that there are both a continuous pore network and a continuous ceramic network that is accessible from every surface. This allows for each ceramic particle to be surrounded by the filler material as the filler material is infiltrated from the bulk structure surface. In other words, this invention provides for an interpenetrating network of both pores and ceramic. There are multiple filling treatments allowing for multiple filling materials if necessary. There is one embodiment where long length fibers will be used but for the most part this invention will provide for a way of making CMCs without fibers.

A first process for producing a ceramic composite structure having a polymer-derived ceramic (PDC) matrix and a plurality of solid fillers includes selecting a mixture of pre-ceramic polymer beads, mixing a plurality of solid fillers with the polymer beads to form a bead-filler mixture, dampening the bead-filler mixture with an added amount of a pre-ceramic resin, packing the dampened bead-filler mixture into a processing vessel, heating the dampened bead-filler mixture with a heat source to form a cured green body, pyrolyzing the green body at a temperature below the degradation temperature of the plurality of solid fillers converting the filler in the green body to a ceramic material, then, simultaneously forming an integrated ceramic composite structure wherein the plurality of solid fillers provide crack bridging in the finished ceramic composite.

In the first process, the step of pyrolyzing the green body occurs at temperatures in a range of approximately 400° C. and up to approximately 600° C. and the mixture of pre-ceramic polymer beads are selected from a polymer-derived ceramic (PDC) system wherein the polymer beads are at least one of green beads, partially pyrolized beads or a mixture thereof.

The polymer-derived ceramic (PDC) system of the preferred process is selected from at least one of silicon oxycarbide (SiOC), silicon carbon nitride (SiCN), silicon titanium oxycarbide, (Si—Ti—C—O), silicon aluminum oxycarbide (Si—Al—C—O), silicon-aluminum oxynitride (Si—Al—O—N) and silicon carbide (SiC) and the solid fillers are selected from at least one of fibers or particles; the fibers are selected from the group consisting of alumina ($Al_2O_3$), silicon carbide (SiC), polyacrylonitrile (PAN), Liquid Crystal Polymer (LCP) carbon fiber, carbon nanofibers, carbon nanotubes, graphene sheets, ceramic fiber, metallic fiber and mixtures thereof and the fibers are coated with a liquid polymer-derived ceramic (PDC) precursor resin to enhance bonding into the green body; the fibers are also mixed in volume fill ratios to pre-ceramic polymer bead in the range of less than approximately 1% to greater than approximately 50%.

Also in the first process, the fibers are in a nanosize from approximately 5 nm to approximately 1000 nm in length and the fibers are also in a micron size from approximately 1 micron to approximately 100 microns in length; in addition, the fibers are in a length dimension sufficient to provide crack bridging for the entire length of a finished ceramic composite structure.

A second process for producing a novel ceramic composite structure comprising a polymer-derived ceramic (PDC) matrix and a plurality of fillers includes selecting a thick, porous, polymer-derived ceramic (PDC) with a thickness greater than 3 mm as a ceramic matrix, infiltrating a plurality of fillers into the pores of the thick ceramic matrix at temperatures from approximately minus 200° C. to approximately 1100° C., and simultaneously forming an integrated, filled ceramic composite structure.

In the second process, the thick ceramic matrix is infiltrated with fillers selected from at least one of polymers, other polymer-derived-resin systems, metal, glass, ceramics, composite systems containing metal, ceramic, plastic, liquid systems which provide a means for plating or depositing metals, ceramics, plastics, carbon fiber, carbon nanofibers, carbon nanotubes, graphene sheets, ceramic fiber, metallic fiber, chemically reactive species in a reaction with the ceramic skeleton, monomer/catalyst solutions and mixtures thereof. The thick, porous, polymer-derived ceramic (PDC) matrix is selected from at least one of silicon oxycarbide (SiOC), silicon carbon nitride (SiCN), silicon titanium oxycarbide, (Si—Ti—C—O), silicon aluminum oxycarbide (Si—Al—C—O), silicon-aluminum oxynitride (Si—Al—O—N) and silicon carbide (SiC). It is further preferred that the thick, porous, polymer-derived ceramic (PDC) matrix has a thickness greater than 3 mm and a porosity between approximately 2% and approximately 98%.

Also in the second process, the step of infiltrating the plurality of fillers into the pores of the ceramic matrix includes pressure assisted infiltration to embed the fillers. The plurality of fillers is selected from at least one of polymers, other polymer-derived-resin systems, metal, glass, ceramics, composite systems containing metal, ceramic, plastic, liquid systems which provide a means for plating or depositing metals, ceramics, plastics, carbon fiber, carbon nanofibers, carbon nanotubes, graphene sheets, ceramic fiber, metallic fiber, chemically reactive species in a reaction with the ceramic skeleton, monomer/catalyst solutions and mixtures thereof.

In the second process, the thick, porous, polymer-derived ceramic (PDC) matrix with a thickness greater than 3 mm is adjusted by pore size, density, composition to aid in the infiltration of fillers to make a material adjustment of a ceramic composite property selected from at least one of mechanical, chemical, thermal, electrical and optical.

A third process for producing a novel ceramic composite structure using the thermal processing cycle characteristics of a polymer-derived ceramic (PDC) matrix and a plurality of fillers includes selecting a mixture of PDC precursor resins, heating the resin mixture to form a green body, putting the green body into a heat source, heating the green body to a final temperature to partially-cure the green body and create a porous structure, infiltrating a plurality of fillers into the pore structure of the partially-cured green body, and forming an integrated ceramic composite structure wherein the plurality of fillers infiltrated into the pores of the partially-cured green body determines the final processing step that is selected from at least one of a chemical reaction, heating, plating, depositing and embedding.

In the third process, the step of heating the green body to a final temperature to partially-cure the green body includes heating the green body to a temperature less than approximately 400° C.; the step of heating the green body to a final temperature to partially-cure the green body also includes heating the green body to a temperature between approximately 400° C. and approximately 600° C.

Also in the third process, the PDC precursor resin is selected from at least one of silicon oxycarbide (SiOC), silicon carbon nitride (SiCN), silicon titanium oxycarbide, (Si—Ti—C—O), silicon aluminum oxycarbide (Si—Al—C—O), silicon-aluminum oxynitride (Si—Al—O—N), silicon carbide (SiC) and mixtures thereof. The plurality of fillers is selected from at least one of polymers, other polymer-derived-resin systems, metal, glass, ceramics, composite systems containing metal, ceramic, plastic, liquid systems which provide a means for plating or depositing metals, ceramics, plastics, carbon fiber, carbon nanofibers, carbon nanotubes, graphene sheets, ceramic fiber, metallic fiber, chemically reactive species in a reaction with the ceramic skeleton, monomer/catalyst solutions and mixtures thereof. The plurality of fillers further includes the attachment of chemically reactive polymers to the fillers to chemically bind the fillers to the polymer-ceramic intermediate selected from at least one of silicon oxycarbide (SiOC), silicon carbon nitride (SiCN), silicon titanium oxycarbide, (Si—Ti—C—O), silicon aluminum oxycarbide (Si—Al—C—O), silicon-aluminum oxynitride (Si—Al—O—N) and silicon carbide (SiC). The plurality of fillers is also compatible with the maximum processing temperature used.

A fourth process for producing a hard, tough ceramic composite structure consisting of fused layers of solid ceramic flakes includes selecting a polymer precursor resin to prepare a plurality of partially cured gelatinous polymer beads, flattening the gelatinous polymer beads into a plurality of flakes, exposing the flakes to a heat source to cure the flattened polymer beads into a plurality of ceramic flakes, collecting the plurality of ceramic flakes, coating the ceramic flakes with polymers having ballistic strength, placing the coated flakes in a mold, aligning the coated flakes in layers, closing the mold and applying pressure to squeeze the layers together, and heating the squeezed layers to fuse the coated ceramic flakes into a structural panel.

In the fourth process, the partially cured gelatinous polymer beads are formed using polymer precursors selected from at least one of silicon carbide (SiC), silicon carbon nitride (SiCN), silicon titanium oxycarbide, (Si—Ti—C—O), silicon aluminum oxycarbide (Si—Al—C—O), silicon-aluminum oxynitride (Si—Al—O—N) and silicon oxycarbide (SiOC). Also, the polymers having ballistic strength used for coating the ceramic flakes are selected from the group consisting of poly-p-phenylenebenzobisoxazole (PBO), siloxanes, siloxane toughened with phenolic resins, aluminum fibers, and low density, ductile metals.

Also, in the fourth process, the step of aligning the coated flakes into layers, further includes vibrating the mold containing the coated flakes until the flakes lay on top of each other in a planar arrangement and placing the plurality of coated flakes in a low viscosity solution of the coating polymer resin to allow the flakes to settle like sediment into layers. In this process, the each ceramic flake has a thickness of from approximately 0.5 microns to approximately 200 microns.

In the fourth process, the step of flattening the gelatinous polymer beads into a plurality of flakes includes putting the polymer beads through rollers to flatten them into flakes, putting the polymer beads into a press to flatten them into flakes, spraying the polymer precursor resin of the gelatinous polymer beads onto a rapidly spinning heated disk, simultaneously splatting, heating and curing the plurality of polymer beads into a plurality of flakes, then shedding the cured flakes into a hopper, and spraying the polymer precursor resin of the gelatinous polymer beads onto a rapidly spinning heated roller, simultaneously flattening, heating and curing the plurality of polymer beads into a plurality of flakes, then shedding the cured flakes into a hopper.

Advantages of this invention include lower temperature processing, reduced manufacturing intervals and lower costs. In addition, new CMC structures can be made which have not previously been made due to cost or temperature concerns. The fact that the ceramic network is made first allows for the ability of plastics and low melting temperature metals or glasses to be a part of the CMC where previously these materials could not be used due to the incompatibility of the high temperature ceramic formation.

Further objects and advantages of this invention will be apparent from the following preferred embodiments.

BRIEF DESCRIPTION OF FIGURES

FIG. 1 is a flow diagram of a process for simultaneously preparing a porous ceramic composite with fibers as an integral part of the structure.

DESCRIPTION OF THE PREFERRED EMBODIMENTS

Figure 2:
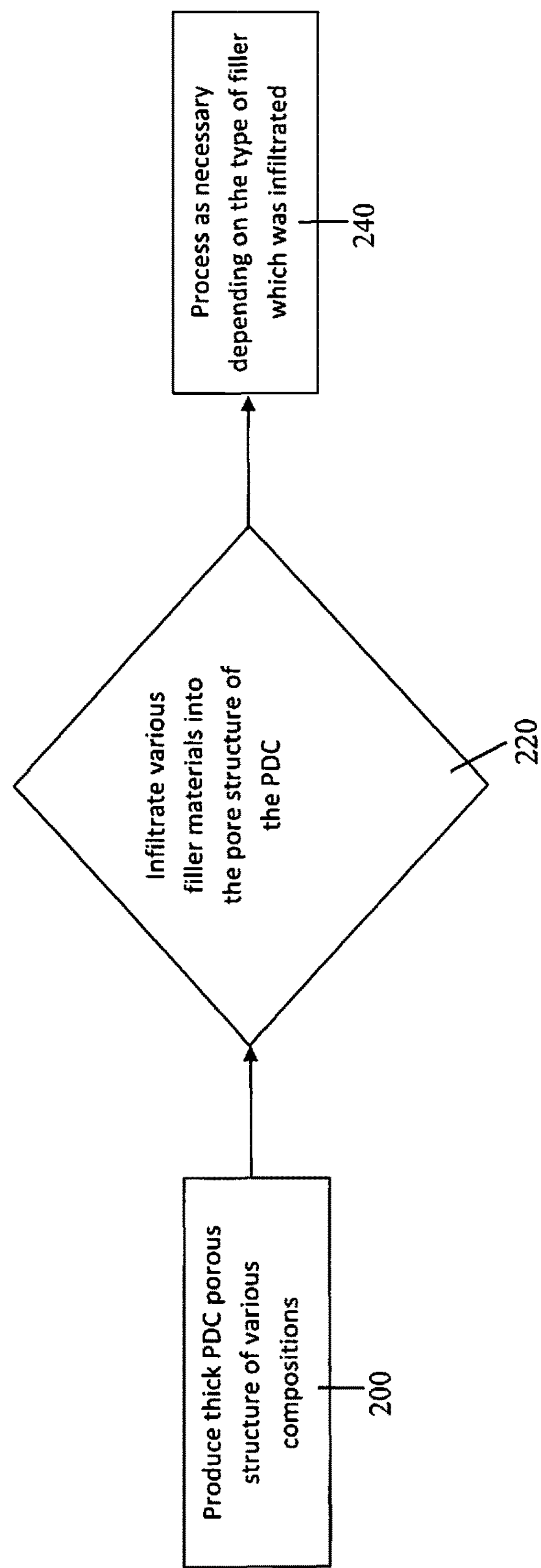
FIG. 2 is a flow diagram of a process for preparing a porous ceramic structure, then filling all pores in the ceramic with a selected filler material.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Incorporated herein by reference are the teachings in U.S. Pat. No. 8,961,840, U.S. patent application Ser. No. 14/858,096, now U.S. Pat. No. 9,434,653 and U.S. Provisional Patent Application Ser. No. 62/232,033 filed Sep. 24, 2015, now U.S. patent application Ser. No. 14/858,096 regarding the manufacture of pre-ceramic polymer beads that are useful in the present invention.

U.S. Pat. No. 8,961,840 provides for the manufacture of beads made from multiple different precursor resins. Each of these resins gives rise to a different ceramic material.

U.S. patent application Ser. No. 14/858,096, now U.S. Pat. No. 9,433,653 provides several methods for forming ceramic particles and compositions that can be shaped, chemically and materially augmented with or without enhancement particles.

U.S. Provisional Patent Application Ser. No. 62/232,033, now U.S. patent application Ser. No. 14/858,096 provides for the manufacture of a fully dense polymer derived ceramic particle with enhancement particles attached to or incorporated within the structure of the particle to provide unique sizes, compositions, mechanical and chemical properties of preceramic polymer beads.

The following terms and acronyms used in the Detailed Description are defined below.

The phrase, "Ceramic matrix composites (CMCs)" refers to a subgroup of composite materials as well as a subgroup of technical ceramics. They consist of ceramic fibers embedded in a ceramic matrix, thus forming a ceramic fiber reinforced ceramic (CFRC) material. A ceramic is used as the matrix and is reinforced with short fibers, or whiskers such as those made from silicon carbide (SiC) and boron nitride (BN).

The term "filler" is used to describe the material embedded into the ceramic matrix. It is used to change physical properties such a wear resistance, friction coefficient, or thermal and electrical conductivity. The filler can be either continuous or discontinuous.

The term "matrix" is used to describe the monolithic, completely continuous material into which a filler, such as a reinforcement material or other component is embedded. This means that there is a path through the matrix to any point in the material, unlike two materials sandwiched together. The matrix provides compliant support for the filler, reinforcement or other component.

The phrase, "Metal Matrix Composites (MMCs)" refers to materials with at least two constituent parts, one being a metal. The other material may be a different metal or another material, such as a ceramic or organic compound. When at least three materials are present, it is called a hybrid composite. MMCs are increasingly found in the automotive industry; these materials use a metal such as aluminum as the matrix, and reinforce it with fibers such as silicon carbide (SiC).

The term "NICALON" is a trademark for ceramic fibers and ceramic products of COI Ceramics, Incorporated, Magna, Utah.

The phrase "Polymer matrix composites (PMCs)" refers to a variety of short or continuous fibers, bound together by an organic polymer matrix. The variety of fibers includes glass, carbon, and synthetic fibers, such as KEVLAR® fibers. KEVLAR is a registered trademark of the DuPont Company, Wilmington, Del.

The Table 1 below provides examples of Polymer Derived Ceramic (PDC) systems useful in the present invention. The Table shows both density and specific density ranges allowing the choice of lighter to heavier weight PDCs when forming a ceramic matrix.

| PDC System | Density Range (g/cc) | Specific Density (g/cc) |
|---|---|---|
| SiOC | 1.7-2.8 | 2.1-2.2 |
| SiCN | 1.85-2.3 | 2.1-2.3 |
| Si—Ti—C—O | 1.9-2.6 | 2.35 |
| Si—Al—C—O | 2.8-3.4 | 3.0-3.1 |
| Si—B—C—N | 1.80-2.3 | 2.1-2.3 |
| Si—Al—O—N | 2.3-3.0 | 2.6 |
| SiC | 3.0-3.3 | 3.05 |

First Embodiment

Simultaneously Preparing a Porous Ceramic Composite with Fibers as an Integral Part of the Structure.

A selection of pre-ceramic polymer beads and fibers are mixed together, dampened with additional pre-ceramic polymer resin, packed into a processing vessel or mold and compressed to the desired density, and heated to form a green body with fibers, now known as a green body composite. After curing, the green body composite is pyrolyzed to the appropriate temperature. The final pyrolysis temperature depends on the type of filler material and the desired final properties of the composite.

For example, if the filler fibers are polymer, then the final pyrolysis temperature would be such that it is below the degradation temperature of the polymer fiber. If the filler fibers are metallic then the final pyrolysis temperature would be below the melting temperature of the metallic fibers. The final pyrolysis temperature also dictates the properties of the ceramic phase of the composite. As the final pyrolysis temperature goes up, the ceramic phase becomes less organic and therefore stronger and more temperature resistant.

The green body composite in this embodiment is then converted to various levels of plastic or ceramic; thus, simultaneously forming an integrated ceramic composite structure.

Depending upon the maximum processing temperatures, there could be instances where this embodiment also makes PMC (Polymer-Matrix-Composites) when the temperatures are below 400° C.-600° C. depending upon the material composition. As the final firing temperature is increased, the pre-ceramic polymer beads transition from a plastic material, through a glass like phase, and finally a ceramic at final firing temperatures greater than 800° C.

An important detail to note with this embodiment is that some of the pre-ceramic polymer beads can be pre-fired to temperatures higher than the final firing temperature of the composite. In other words the initial mixture of materials for the composite could be certain percentages of beads that have been pre-fired to different temperatures which would then be mixed with fibers. For example, as shown in FIG. 1, a composite starting mixture 100 may contain 70% pre-ceramic beads that have been pre-fired to only 300° C., 20% pre-ceramic beads that have been pre-fired to 700° C. and the remaining 10% could be alumina fibers 110 mixed with the pre-ceramic beads. Then the mixture of pre-ceramic beads and fibers is dampened with some additional uncured pre-ceramic resin 120 and packed in a mold and cured to make a green body 130. Then the green body is fired to a final temperature of approximately 600° C. 140.

The resulting composite would be made from a polymer-ceramic transient phase which would have its own set of unique properties, mixed with 700° C. fired pre-ceramic beads which would have yet another set of unique properties, mixed with alumina fibers which also have their own unique properties. As the pre-ceramic beads transition from polymer to ceramic the physical properties change. These properties can be captured by stopping the firing process at any point along the way.

By mixing these beads in different ratios and different firing temperatures one can obtain a matrix with a multitude of different properties. Then by adding different fibers in different quantities the possible number of different composites obtainable grows even larger. In the first embodiment, also called "spaghetti and meatballs" by inventor, Arnie Hill, the fibers and ceramic matrix are placed together at the beginning of the process. The fibers would be of such a length dimension to provide crack bridging for the composite.

The fibers could be of the following materials or be a mixture of the following: Alumina ($Al_2O_3$), silicon carbide (SiC), polyacrylonitrile (PAN), Liquid Crystal Polymer (LCP), Carbon, Nicalon™ ceramic fiber and the like. In the case of the PAN fibers, the PAN fibers will be converted to high strength carbon fibers during firing.

The ceramic matrix would be PDC based with the potential of using PDC resins that are available, such as the resins described in scientific journals; the resins disclosed are incorporated herein by reference to the journal articles: "Active-Filler-Controlled Pyrolysis of Preceramic Polymers" by Peter Greil in *J. Am. Ceram. Soc.*, 78 (4) 835-348 (1995); "Polymer Derived Engineering Ceramics" by Peter Greil *Advanced Engineering Materials* 2000, 2, No. 6; "Polymer-Derived Ceramics: 40 Years of Research and Innovation in Advanced Ceramics" by Paolo Colombo in *J. Am. Ceram. Soc.*, 93 (7) 1805-1837 (2010).

In the optimal process, the PDC resin system is selected or modified to match the shrinkage of the long fiber systems in order to maximize mechanical properties. After the initial mixing procedure where the fibers and the PDC resin are placed in the processing vessel, then the vessel is placed in a furnace or other heating equipment. Then, the composite mixture will be brought to at least a temperature where the polymer fiber will be converted to a ceramic or hard plastic element. The maximum temperature and time for forming the composite will be determined by optimal properties of the composite including providing for an optimum shrinkage match.

A further illustration of the first embodiment is the use of a bulk ceramic produced by the PDC route beginning with partially cured beads of PDC precursor resin pressed into a mold to a desired density and porosity. The mold is heated to complete the cure and fuse the precursor beads together into a porous monolithic green body which is then pyrolyzed into a ceramic component with pores. This porous ceramic is what constitutes a matrix, but if the pores are not filled with anything then it isn't a composite. It is just a porous piece of ceramic.

In the first embodiment a porous piece of ceramic has fibers in it and even with the fibers inside the cured ceramic composite, there will still be pores. The thermal, mechanical and other physical properties of these ceramic components can be modified by the inclusion of active or inactive fillers to create a filled ceramic composite material.

The fillers may be in the form of fibers or particles. To produce such a composite one would select the desired filler which may be a chopped or continuous fiber made from a polymer or a metal or a ceramic or an organic fiber such as high strength carbon fiber, carbon nanofibers, or carbon nanotubes or graphene sheets. The fibers would be mixed in volume fill ratios to the precursor beads in the range of <1% to >50%.

The fibers may be sized in the nano scale from approximately 5 nm to approximately 1000 nm in diameter or length or into the micro scale approximately 1 micron to less than approximately 100 microns in diameter or length. Lengths can also extend up to many centimeters. The fiber may be coated with a liquid PDC precursor resin if desired to enhance bonding into a green body matrix. The fibers are characterized by a length dimension and a diameter dimension and the particles are characterized by diameter size.

Second Embodiment

Preparing a Porous Ceramic, then Filling all Pores with a Filler Material.

In the second embodiment, novel structures are produced which have not been made before. A porous ceramic is made first then liquid metal or polymer is injected into the pores to fill all of the empty space inside the ceramic.

A method taught in U.S. Pat. No. 8,961,840, is used to produce thick porous polymer-derived-ceramic structures (>3 mm thick) of various compositions including SiOC, SiCN, SiC, as well as others well known to those skilled in the art. As shown in FIG. 2, the thick ceramic body will be made first 200. This thick ceramic member can have ceramic network densities as low as 2% and as high as 98%. In U.S. Pat. No. 8,961,840, the porosity of the green body varies between 2% and 98% ceramic porosity. Filler material(s) are then infiltrated into the pores 220. Further processing to form the finished ceramic composite occurs at temperatures at which the filler material becomes a plastic or ceramic 240. One preferred embodiment is pressure assisted infiltration. Materials which could be infiltrated into the pore network include, but are not limited to:

1) Polymers, such as, ultra-high molecular weight polyethylene, Poly-paraphenylene terephthalamide, poly(p-phenylene-2,6-benzobisoxazole, and the like.
2) Other Polymer-Derived-Resin Systems, such as polycarbosilanes, polyborosilanes, polycarbosiloxanes, and the like.
3) Metals, such as, aluminum, nickel, copper, and steel.
4) Glasses such as, borosilicate glass, alumino silicate glass, soda lime silica glass, glass fibers.
5) Other ceramics, such as, but not limited to, silicon carbide, silicon nitride, alumina, boron carbide, boron nitride.
6) Composite systems containing metal, ceramic, plastic, or other types of particles.
7) Liquid systems which would provide a means for plating or depositing metals, ceramics, plastics, or other types of particles, such as, electroless nickel, electroless copper.
8) Chemically reactive species which will form new compounds in a reaction with the ceramic skeleton, such as, silicon carbide formed by contact with infiltrated liquid silicon.
9) Monomer/catalyst solutions whereby preferred high performance polymers are polymerized in situ. This will allow polymers which have high melt viscosities to be infiltrated into the porous ceramic bodies while in the low viscosity monomer state.
10) Organic materials, such as carbon fibers, carbon nanofibers, carbon nanotubes, graphene sheets.
11) Mixtures of substances identified in 1-10 above.

The organic materials, metal, glass, polymer, and ceramic particles are added to alter the properties of the porous PDC to make the properties of the ceramic composite more advantageous to a particular application.

It must be emphasized again that these unique composite structures are not previously known because the ceramic matrix is typically formed at the end of the process. Prior to the present invention, the materials that could be incorporated into a ceramic composite were limited because of temperature limitations, typically 1000° C. or greater, which was required to form a ceramic structure. The present invention allows for plastics and low melting temperature metals to be used in the composite as the material limitations are determined by the infiltration process temperature. This temperature could be from approximately −200° C. to approximately 1100° C. for most PDC systems with some systems able to handle a maximum temperature of 1800° C. for short time intervals.

The bulk porous ceramic network can be adjusted by pore size, density, composition or other parameter to either aid in the material infiltration or to make an advantageous material property adjustment of a mechanical, chemical, thermal, electrical, or optical nature. Furthermore, most CMCs or PMCs used today use long fibers, primarily carbon (C) or silicon carbide SiC or polyacrylonitrile (PAN), as the structural reinforcement element. Polymer foam can be embedded in a ceramic foam, for example, if the filler material is a polymer.

Third Embodiment

Infiltrating Filler Materials into a Partially-Cured PDC Green Body in the Plastic or Transition Region.

The third embodiment provides unique composites using the unique thermal processing cycle characteristics that are associated with PDCs. Polymer-Derived-Ceramics start out as a polymer resin. Through various processes and thermal cycles, the polymer transitions to a ceramic as it moves up the temperature curve. In most cases, the transition to a ceramic begins to occur in the temperature range between approximately 400° C.-approximately 600° C. The nature of the polymer-ceramic intermediate state is set by the maximum process temperature and process time of the PDC. Thus, there are other matrix skeleton material options besides ceramics using PDCs depending upon the maximum process temperature.

Figure 3A:
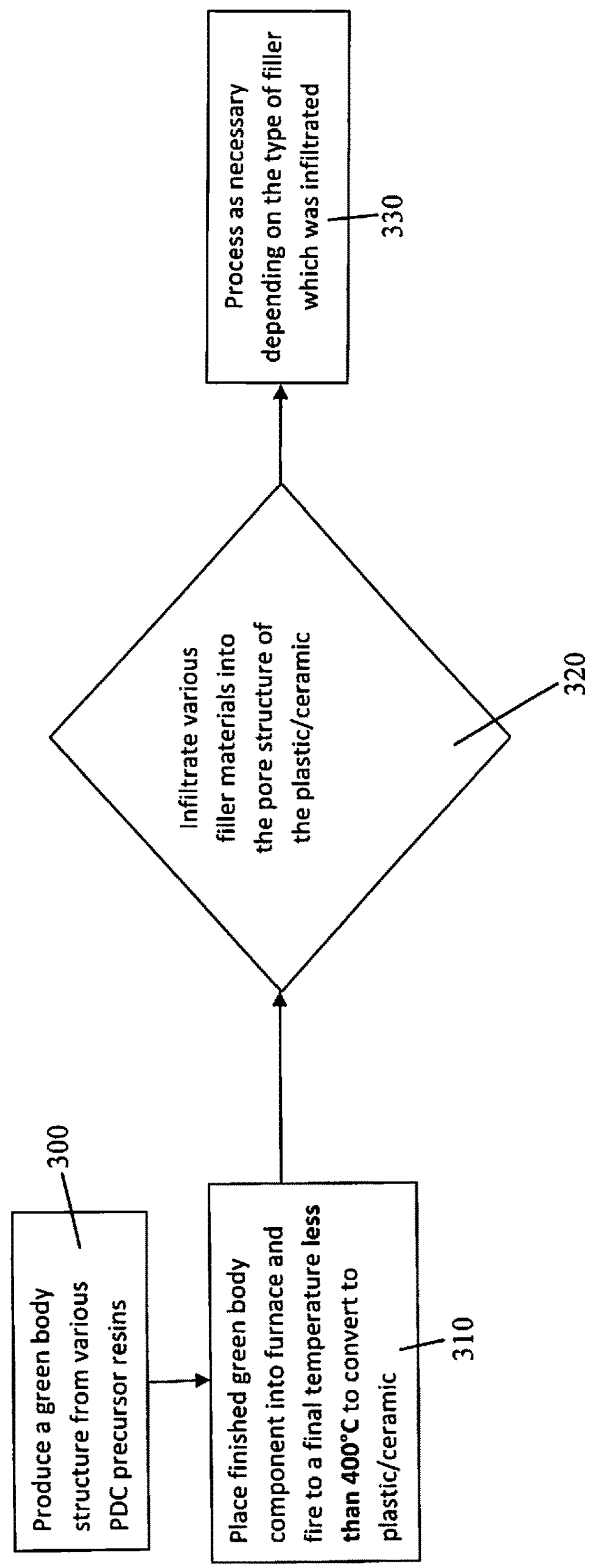
FIG. 3A is a flow diagram of a process wherein a partially-cured green body is heated to a temperature less than approximately 400° C. and converted to a plastic stage, then is infiltrated with a filler material that is then cured to a ceramic based on the curing temperature of the filler material.

In FIG. 3A, a green body is produced from various PDC precursor resins 300. The maximum process temperature is less than the temperature needed for onset of becoming a ceramic body. In this case, there will be no outgassing and the maximum operating process temperature is less than 400° C. 310. In addition, typical fillers like other plastics, metal particles, fibers of various size and compositions, including, but not limited to, carbon fiber, carbon nanofibers, carbon nanotubes, graphene sheets, minerals, glasses, ceramic particles as well as other known fillers for plastics are used to infiltrate the pore structure of the plastic or ceramic composite 320. Using chemically reactive polymers attached to fillers allows for chemically binding the filler to the PCD plastic or the filler can be inert to the plastic matrix such as is the case with most filled plastics today. Without outgassing the need for a porous network is eliminated. The type of filler determines the processing method and temperature limits for making a ceramic composite 330.

Figure 3B:
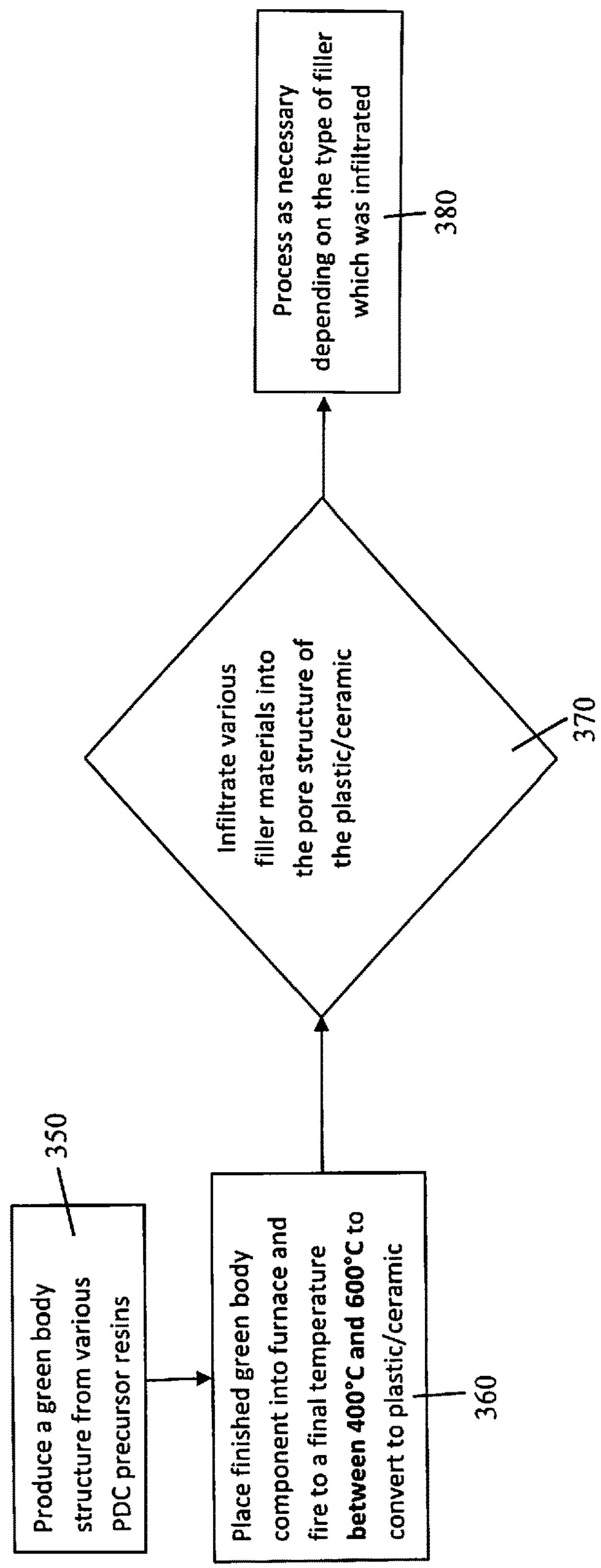
FIG. 3B is a flow diagram of a process wherein a partially-cured green body is heated to temperatures between approximately 400° C. and approximately 600° C. and in a transitional plastic/ceramic stage is infiltrated with a filler material that is then fully cured to a ceramic based on the curing temperature of the filler material.

In FIG. 3B, a green body is produced from various PDC precursor resins 350. The maximum process temperature is between 400° C.-600° C. 360. This will form an intermediate material matrix which will have both plastic and ceramic characteristics. The nature of the outgassing from pyrolysis will determine how much porosity is needed to have a stable structure. Various fillers are infiltrated into the pore structure of the intermediate material matrix 370. This will determine how much subsequent processing 380 is needed to make a composite that will mirror the process in FIG. 2 or the process in FIG. 3A or be a combination of the processes in FIG. 2 and FIG. 3A. This quasi-plastic/ceramic matrix will have unique characteristics that will be set by the maximum processing temperature and time at temperature. Obviously, the other composite materials used in the unique ceramic composites of the present invention must be compatible with the maximum processing temperature used.

Figure 4:
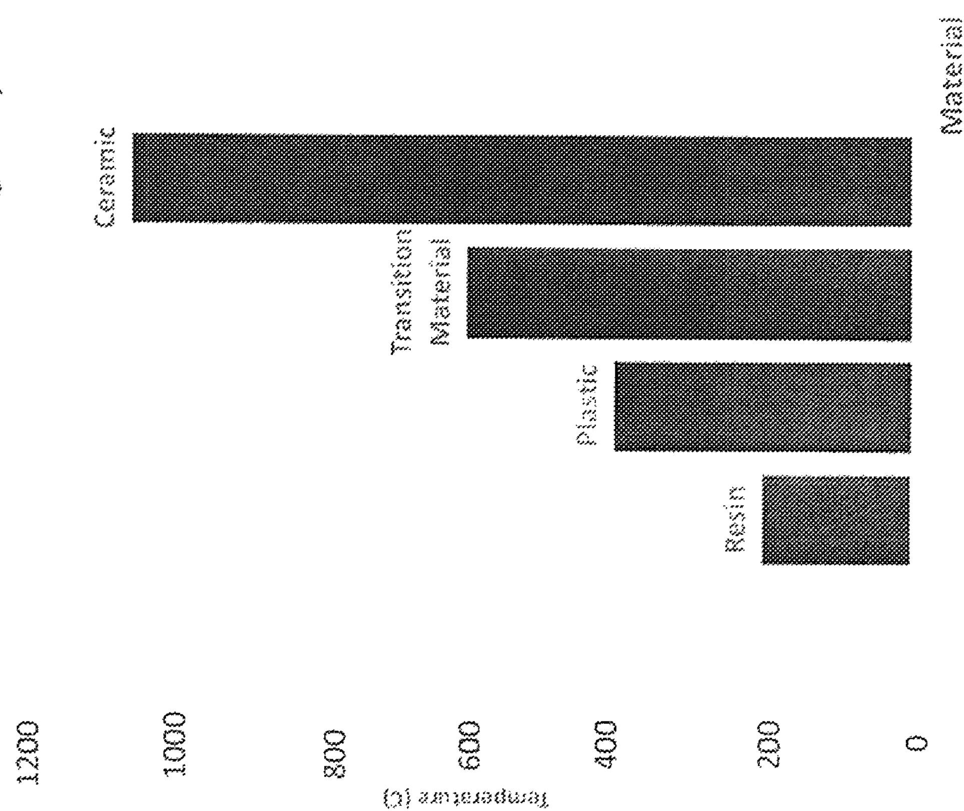
FIG. 4 is a bar graph showing approximate PDC processing temperature ranges for polymer pre-cursor resins converting from resin to ceramic in the present invention.

FIG. 4 is a bar graph showing approximate PDC processing temperature ranges that are used in the processes disclosed in Embodiments 1, 2, and 3. The graph shows that in a temperature range from approximately 0° C. to approximately 200° C. the pre-ceramic resin remains as a resin in a liquid or fluid state. In a temperature range from approximately 200° C. to approximately 400° C. the pre-ceramic resin changes to a plastic state that is less fluid. In a temperature range from approximately 400° C. to approximately 800° C. the pre-ceramic resin goes from a plastic state to a quasi-plastic/ceramic in what is referred to herein as the "transition region." In a temperature range from approximately 800° C. to approximately 1000° C. the pre-ceramic resin is converted from a quasi-plastic/ceramic to a ceramic.

Fourth Embodiment

Preparing PDC Flakes Coated with Ballistic Polymers and Fused into a Composite Structure.

In the fourth embodiment, partially cured gelatinous beads are made as taught in U.S. Pat. No. 8,961,840, U.S. patent application Ser. No. 14/858,096 and U.S. Provisional Patent Application Ser. No. 62/232,033. The gelatinous beads of varying compositions are put through rollers or a press to flatten them out into flakes approximately 1 micron up to 200 microns thick, then put in an oven to finish the cure to solid plastic flakes.

Another option for making solid plastic flakes involves spreading out a thin layer of liquid pre-ceramic precursor resin on a flat surface which could be a quartz plate or even float the liquid pre-ceramic precursor resin on a high temperature liquid that is of higher density than the pre-ceramic precursor resin then heat to cure the resin into solid plastic sheets which would then be broken up into smaller flakes.

A third option for making flakes includes spraying the liquid pre-ceramic precursor resin on a spinning heated drum. The liquid droplets would create splats on the heated spinning drum and the heat would cure the liquid resin to solid plastic flakes which would be scraped off the drum (or spinning platter) as it turns.

After preparing and collecting a sufficient number of plastic flakes, the flakes are put in a furnace and fired to convert them to ceramic flakes. A continuous process can be used where the ceramic flakes are produced in a conveyor furnace, but the ultimate goal is to produce thin ceramic flakes made of any of the PDC ceramics desired.

The flakes are then coated with metal or ballistic polymers such as Kevlar® synthetic fibers or the other above mentioned ballistic polymers. Pure polymers or polymers mixed with ceramic nanoparticles or carbon nanotubes can also be used. The coated flakes are placed in a mold. The mold is vibrated to get all of the flakes to lay on top of each other flatwise. Adding liquid can temporarily help "sediment" the flakes into layers like sand stone.

The mold is then closed and pressure is applied to squeeze the layers then heat is applied to sinter the flakes together. For metals, standard sintering temperatures are used, as is known in the art. Thermoplastic polymers are heated to the melting temperature to fuse the plastic coated flakes together. For thermoset polymers the coating on the flakes would stay wet until the flake were pressed into the mold. Heating the mold would cure the thermoset resin thus fusing the ceramic flakes together. This technology would produce a composite that mimics the structure seen in nacre which makes up Abalone sea shells and is very tough.

The ceramic composites in the fourth embodiment could be used for ballistic armor or light-weight, high-strength, high stiffness tough structural panels for use in the aerospace industry or construction industry.

Further to the general discussion of the preparation of PDC flakes coated with ballistic polymers is the following specific application, provided as an example, and not a limitation of the invention.

Silicon Carbide Based Microlaminate Armor for Personnel and Vehicle Applications Ceramic plates of material suitable for use as ballistic armor are economically produced. The plates are composed of micron sized, hard silicon carbide flakes or platelets laminated in a tough, somewhat flexible matrix. The silicon carbide based flakes or platelets are produced from newly developed polymeric precursors to silicon. The matrix material evaluated includes PBO and other materials with high toughness and strain tolerance such as siloxanes or siloxane toughened phenolic resins, as well as aluminum or other low density, ductile metals.

Figure 5:
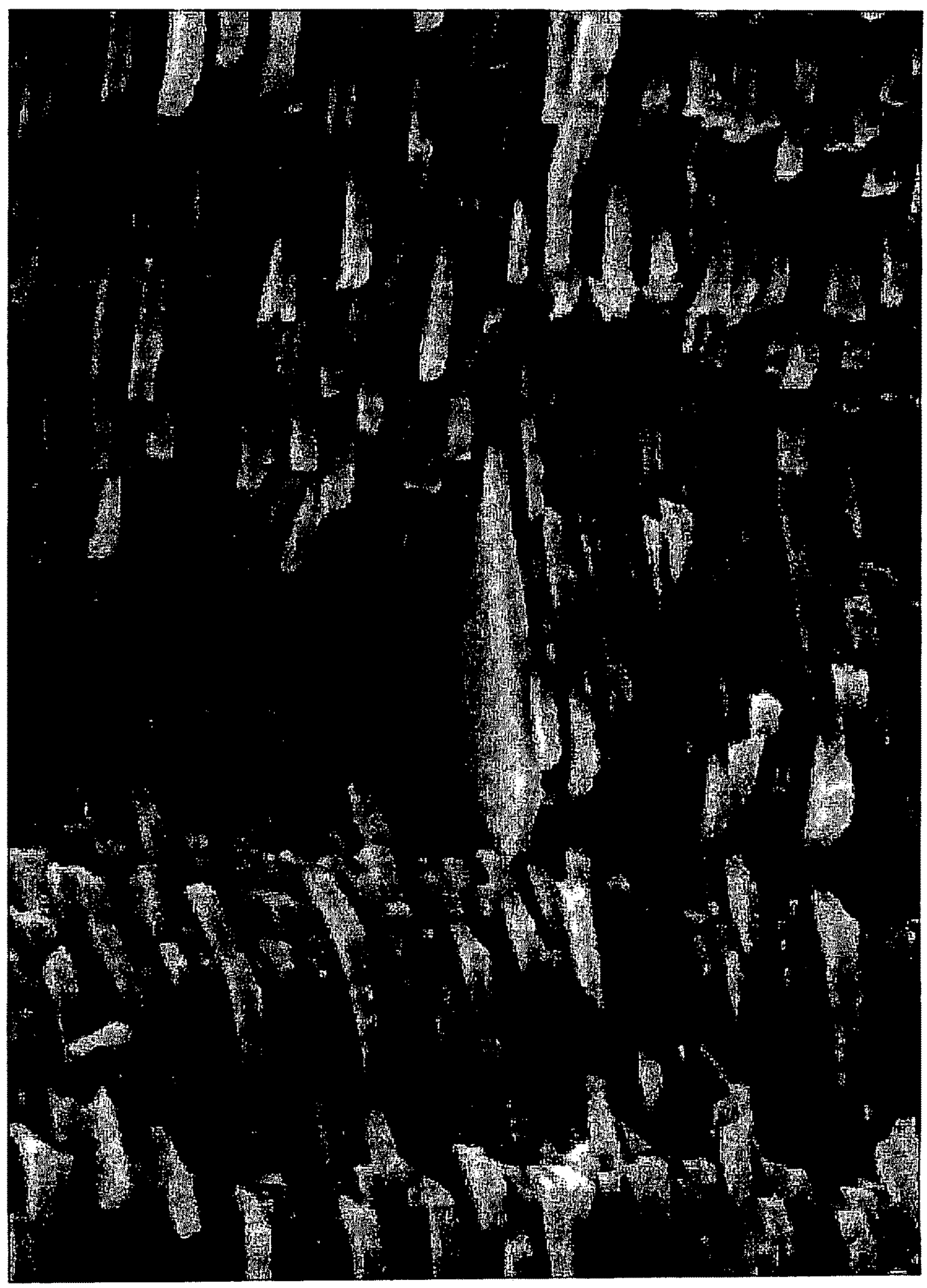
FIG. 5 is a scanning electron micrograph of nacre nanobricks which is the model for the arrangement of PDC flakes in the fourth embodiment of the present invention (Prior Art).

The ceramic composite mimics the very hard and tough structure of the Abalone shell (nacre) but with silicon carbide based filler instead of calcium carbonate. The work of fracture of the nacre structure is 3000 times that of pure ceramic. The unique processing capabilities of polymer derived ceramics (PDC's) provide an easy and scalable method of producing this type of structure. FIG. 5 is an electron micrograph of a section of the nacre material found in nature, that is synthesized as a ceramic composite.

Figure 6:
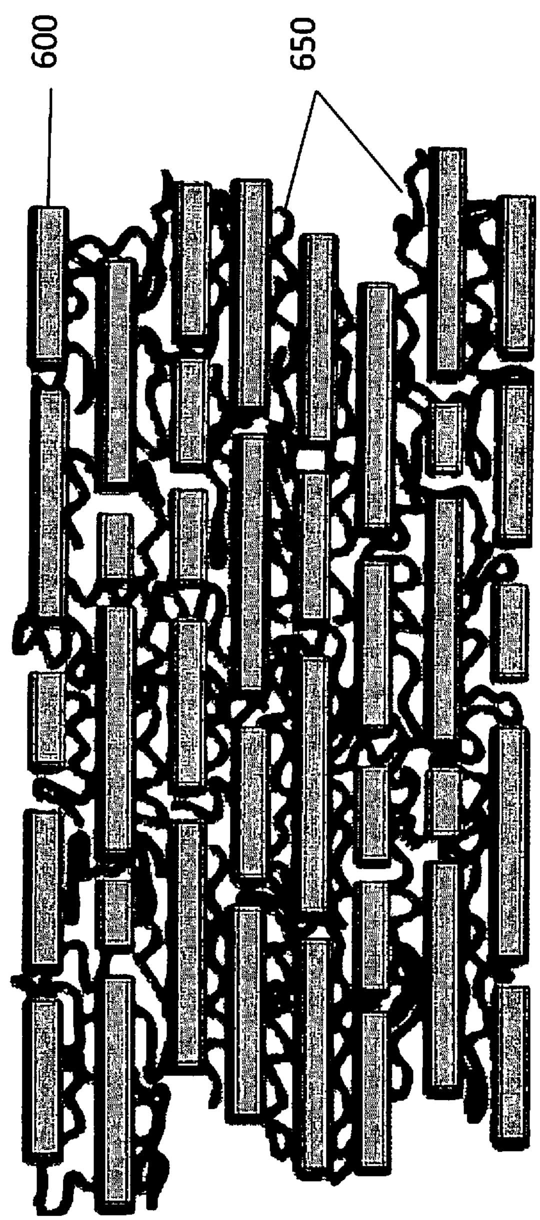
FIG. 6 is a schematic depiction of the brick wall-like laminar structure of the ceramic composite in the fourth embodiment of the present invention.

FIG. 6 is a schematic of the brick wall-like laminar structure of the ceramic composite. The silicon carbide platelets 600 will be fabricated into high aspect ratio polymer platelets made from the preceramic liquid precursor and then fired in a furnace to convert them into micron scale silicon carbide platelets. The ceramic platelets will then be coated with a thin layer of metal or polymer 650. The coating 650 will allow the platelets to be sintered together thus producing the nacre-like structure.

By way of background, silicon carbide and silicon carbon nitride have been coveted for use as body armor due to their high hardness and low density. However, producing silicon carbide type compounds is typically done by combining silicon and carbon at very high temperatures (>2500 C). Silicon carbide flakes have been produced by chemical vapor deposition on a flexible or high temperature substrate followed by removal of the thin layer by flexing the substrate. All of the above methods are expensive and not easily scaled.

Process Description. A number of routes are available to produce both the silicon carbide-based flakes or platelets and to coat them with the tough matrix material.

Newly developed polymer precursors to silicon carbide and silicon carbonitride will be used to produce thin (~0.5-1 micron) thick sheets by casting catalyzed polymer precursor onto thin sheets of polytetrafluoroethylene (PTFE) or polyimide films. The thickness can be controlled by the viscosity of the polymer which can be thinned by solvents, if necessary. Alternatively, the polymer can be "splat cured" onto a rapidly spinning heated disk, or rapidly spinning heated roller which then sheds the cured flakes into a hopper. The cured flakes are then pyrolyzed in inert gas to form the silicon carbide or silicon carbonitride.

Making platelets would simply involve utilizing higher viscosity polymers and/or faster curing rates to make thicker sheets of cured polymer, followed by pyrolysis and post pyrolysis milling to obtain the right size range.

The flakes or platelets would be embedded in either a tough high strain polymer matrix by coating the flakes with a low viscosity solution of the chosen resin and then causing the flakes to orient in a planar arrangement. Another route to accomplish the orientation is to allow the flakes to "settle" in a low viscosity solution of the matrix polymer and then evaporate off the solvent, or to evaporate off most of the solvent and orient the flakes (or platelet) by slowly pressing between platens, forcing the material between rollers, or forcing the material through a die orifice. The plates, rollers, or dies are heated to promote curing of the resin. For metal matrices, similar processes are used, but the temperature would need to be higher and the pressure would likely need to be maintained during the heating step to "sinter" the metal.

Also, the effect of adhesion promoters and coupling agents will be evaluated, starting with the aminopropylsilane type materials used on other ceramic fillers. If necessary, the coupling agents can also be modified to improve their adhesion to both the matrix and the filler. Filler without any adhesion promoters/coupling agents will be used as a baseline.

Matrix toughened silicon carbide and silicon carbonitride materials are characterized by measuring mechanical properties such as flexural strength, toughness, hardness, and density in accordance with standardized ASTM test methods. Microstructures produced by the various processes are evaluated with optical and electron microscopy. Ballisic testing is performed to evaluate performance.

In summary, with low manufacturing costs compared to the prior art, the present invention solves the problem of making strong, durable, light-weight, high performance ceramic composites suitable for industrial applications. Prior to this invention, polymer-derived ceramic structures were formed at the end of the synthesis process for ceramics and at very high temperatures, typically greater than 1000° C. The formation of a ceramic composite, prior to the present invention, limited the materials that could be in the composite. Plastics, low melting temperature metals, chemically reactive species were routinely excluded from the components considered in a ceramic composite structure; yet, the properties and enhancements to a ceramic composite would be suitable for many industrial applications. The present invention provides novel ceramic composite structures to meet and fill a substantial need.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A process for producing a novel ceramic composite structure using the thermal processing cycle characteristics of a polymer-derived ceramic (PDC) matrix and a plurality of fillers, comprising the steps of:

selecting a mixture of PDC precursor resins;

heating the resin mixture to form a green body;

putting the green body into a heat source;

heating the green body to a final temperature to partially-cure the green body and create a porous structure with a thickness greater than 3 millimeters; wherein the porous structure of the partially-cured green body is an intermediate material matrix with both plastic and ceramic characteristics;

infiltrating a plurality of fillers into the porous structure of the partially-cured green body; and selecting a final processing step wherein the plurality of fillers infiltrated into the porous structure of the partially-cured green body determines a processing method and a temperature limit for forming an integrated ceramic composite structure, the final processing step is selected from at least one of a chemical reaction, heating, plating, depositing or embedding.

2. The process of claim 1, wherein the step of heating the green body to a final temperature to partially-cure the green body includes heating the green body to a temperature less than approximately 400° C.

3. The process of claim 1, wherein the step of heating the green body to a final temperature to partially-cure the green body includes heating the green body to a temperature between approximately 400° C. and approximately 600° C.

4. The process of claim 1, wherein the mixture of PDC precursor resins is selected from at least one of a plurality of polymer derived ceramic (PDC) systems including silicon oxycarbide (SiOC), silicon carbon nitride (SiCN), silicon titanium oxycarbide, (Si—Ti—C—O), silicon aluminum oxycarbide (Si—Al—C—O), silicon-aluminum oxynitride (Si—Al—O—N), silicon carbide (SiC) and mixtures thereof.

5. The process of claim 1, wherein the plurality of fillers is B selected from at least one of polymers; polymer-derived-resin systems; metal; glass; ceramics; composite systems containing metal, ceramics, and/or plastics; liquid B systems which provide a means for plating or depositing metals; carbon fiber; carbon nanofibers; carbon nanotubes; graphene sheets; ceramic fiber; metallic fiber; chemically reactive species in a reaction with a ceramic skeleton; monomer and catalyst solutions; and mixtures thereof.

6. The process of claim 5, wherein the plurality of fillers further includes a chemically reactive polymers attached to the fillers to chemically bind the fillers to a polymer-ceramic intermediate; the polymer-ceramic intermediate is selected from at least one of silicon oxycarbide (SiOC), silicon carbon nitride (SiCN), silicon titanium oxycarbide, (Si—Ti—C—O), silicon aluminum oxycarbide (Si—Al—C—O), silicon-aluminum oxynitride (Si—Al—O—N) and silicon carbide (SiC).

7. The process of claim 1, wherein the plurality of fillers are compatible with a maximum processing temperature.

* * * * *